United States Patent [19]

Chaumont et al.

[11] 4,218,865
[45] Aug. 26, 1980

[54] AGRICULTURAL MACHINES

[75] Inventors: Gérard P. L. Chaumont, Dijon; Jean-Claude A. Boirin, Pontailler sur Saone; Jacques J. M. G. Jouffroy, Chenove, all of France

[73] Assignee: Sperry Corporation, New Holland, Pa.

[21] Appl. No.: 5,129

[22] Filed: Jan. 22, 1979

[30] Foreign Application Priority Data

Jan. 24, 1978 [GB] United Kingdom ................. 2754/78

[51] Int. Cl.³ ............................................ A01D 35/26
[52] U.S. Cl. ...................................... 56/13.6; 56/15.8
[58] Field of Search ................. 56/13.6, 6, 15.7, 15.8, 56/15.9, 192

[56] References Cited

U.S. PATENT DOCUMENTS

| | | | |
|---|---|---|---|
| 3,151,429 | 10/1964 | Dyrdahl | 56/208 |
| 3,266,230 | 8/1966 | Rowbotham | 56/208 |
| 3,751,889 | 8/1973 | Overesch | 56/13.6 |
| 3,772,865 | 11/1973 | Ruprecht | 56/192 |
| 4,072,001 | 2/1978 | Aldred | 56/13.6 |

FOREIGN PATENT DOCUMENTS

| | | | |
|---|---|---|---|
| 2630493 | 1/1978 | Fed. Rep. of Germany | 56/13.6 |
| 1135862 | 12/1968 | United Kingdom | 56/13.6 |

Primary Examiner—Jay N. Eskovitz
Attorney, Agent, or Firm—Larry W. Miller; Frank A. Seemar; Ralph D'Alessandro

[57] ABSTRACT

The invention relates to agricultural machines and is particularly applicable to tractor mounted drum mowers which suffer from the problem of tilting about the ground engaging point nearest to the tractor when undergoing right-hand turns. This problem is met by the provision of a machine having a mounting beam, a main beam supporting in a depending fashion one or more working units and at least three links for floatingly coupling the main beam to the mounting beam, at least one of the links being coupled to the main beam at a location below the latter. This provides a stable machine and in order to obtain independent flotation of the working units when more than one is employed, the links are coupled to the respective beams by universal joints with the exception of one link which is coupled to the mounting beam by a non-universal pivot in order to prevent a transverse shift of the working units during flotation.

16 Claims, 5 Drawing Figures

AGRICULTURAL MACHINES

BACKGROUND OF THE INVENTION

1. Field of the Invention

The present invention relates to agricultural machines such as a mower of the type comprising at least one rotary mower unit depending from a main mounting beam. More particularly, the invention relates to suspension and flotation means for agricultural machines which may be of the tractor mounted or pull type.

2. Description of the Prior Art

In known mowers of the type referred to above, normally there are provided two or more such rotary mower units and these may comprise an upright drum with a flange at the lower end thereof for supporting outwardly projecting impact cutter blades. All the mower units depend from a main beam in side-by-side relation, when in the operative position. Either a stationary, or a freely rotatable, ground-engaging, generally saucer-like support member or skid is provided underneath each rotary mower unit in a manner to support the mower on the ground during operation and to shield the cutter blade mounting means on the drum flanges. The main beam with the mower units depending therefrom is coupled to a three point hitch structure for attachment to a tractor in a manner so that the main beam may pivot in a fore-and-aft direction as well as float in an up-and-down direction relative thereto. The pivotal movement in a fore-and-aft direction is required so as to be able to move the mower from a transport position generally longitudinally and rearwardly of the tractor to an operative position generally transverse and offset relative to the tractor. The floatation in an up-and-down direction is required to allow the mower to follow the ground contour in operation.

Suspension and flotation means are provided between the three point hitch and the main beam to compensate a certain proportion of the weight of the mower so that the latter rests on the ground surface with only a limited ground pressure. With a reduced ground pressure, the ground-engaging supports are less subject to wear. Also the suspension and flotation means should assist the mower in floating over ground irregularities, thus avoiding damage to the turf, as well as the machine, whilst maintaining a substantially constant stubble length.

Many types of suspension and flotation means have already been designed for drum mowers and other tractor-mounted agricultural machinery. However, many of them are not entirely satisfactory. Some do not compensate sufficiently the weight of the mowers so that the ground pressure of the supporting members is too high, with the result that the mower and supporting members are dragged over the ground imparting undue stresses to the machine, the supporting members or skids wear fast, and the machine "bulldozes" or digs into the ground surface. The latter results in the turf being damaged and the cut hay to be mixed with soil. Regrowth of damaged turf is of course slowed down substantially. Furthermore the mower does not float smoothly over ground irregularities.

In the case of a twin-drum mower, it is not possible properly to adjust the ground pressure exerted by both mower units which means that in most cases the ground pressure of one mower unit exceeds the ground pressure of the other mower unit which is very undesirable. In other structures, it may be that the ground pressure can be adjusted in an acceptable manner but often the system is then not flexible enough to keep the mower in constant contact with the ground surface. Thus, when an obstruction or a depression in the ground is met, the mower lifts off the ground and tends to "jump" over the obstruction or depression which results in unequal and unacceptable stubble lengths.

In still a further arrangement, the ground pressure in normal conditions can be adjusted in an acceptable manner but as soon as a rise in the ground surface is met, the ground pressure is increased substantially and to an unacceptable degree. In other words, the system also is not flexible enough to "float" over ground irregularities. In such circumstances, a major portion of the weight of the mower structure and of the main beam is supported on the ground surface via the mower unit encountering the rise in the ground. This is disadvantageous as again it results in faster wear of the supporting skids and imparts high stresses to the mower units and the mower suspension on the three point linkage.

The foregoing disadvantages of known mowers become more critical when the forward speed of the tractor and the machine is increased and there is a growing tendency to increase the normal working speed of rotary mowers as much as possible in the interest of productivity. The disadvantages mentioned are equally more critical when the total machine weight is higher which is especially the case when a crop conditioner is attached to the mower structure to provide a mower-conditioner.

Another problem which may occur is the tilting of the mower around the left-hand side of the left-hand supporting member or skid during fast turns to the right. This problem occurs especially on machines with fixed supporting skids or members and with a pivotal mounting of the main beam to the three point hitch structure or to an intermediate beam around a fore-and-aft pivot axis, the pivot axis being positioned at a substantial height above the ground surface. However, the same tipping tendency may be experienced also with mower structures not having the above described fore-and-aft pivot axis. To understand this phenomenon, it is necessary to realise that in the operative position the mower is positioned rearwardly of the rear tractor wheels and to the right of the tractor. Therefore, when turning to the right, the mower is subjected to a pulling force from the tractor which is directed to the left, tending to cause the mower to slide to some extent to the left over the ground. This pulling force is exerted at a distance above the ground level, and when there is a fore-and-aft pivot axis between the mower structure on the one hand and the three point hitch structure or intermediate beam on the other hand, this pulling force will act on the pivot. This pulling force tends to tilt the mower structure about the left-hand side of the left-hand supporting member or skid, especially when the skid is mounted stationary and thus cannot allow the mower to "roll" over the ground surface. This lifting tendency increases as the turning speed of the tractor increases; as the distance between the mower and the rear tractor wheels increases, as the height of the point of application of the pulling force above the ground level increases and as the distance between the centre of gravity of the mower and said point of application decreases. Obviously, the above described unstability of a tractor mounted-mower is a severe drawback.

It is the object of the present invention to overcome or to attenuate one or more of the foregoing disadvantages of agricultural machinery such as mowers and mower-conditioners, for example.

SUMMARY OF THE INVENTION

According to the invention an agricultural machine comprises a mounting beam, a main beam supporting in a depending fashion one or more working units and at least three links for floatingly coupling the main beam to the mounting beam, at least one of the links being coupled to the main beam at a location below the latter.

With this arrangement, the force tending to tip the machine when being turned is reduced due to the location of the coupling of said at least one link below the main beam, and hence close to the ground. Preferably said at least one link itself extends below the main beam.

In order to provide independent flotation for each working unit and yet prevent any transverse shift of the latter, the three links are each coupled to the mounting beam and main beam by universal joints with the exception of one link which is coupled to the mounting beam by a non-universal pivot. Preferably two spaced non-universal pivots are employed.

The two links other than said at least one link may extend between upwardly projecting brackets on the main beam and coupling points on the mounting beam whereby they are spaced above the main beam. These two upper links may be generally parallel to each other and spaced apart in transverse direction over a substantial length. In case of a twin unit drum mower, the left-hand and right-hand upper links preferably are positioned to the left of the respective mower units. Said at least one, and lower, ink is then positioned generally below the left-hand upper link and extends between a coupling point at the lower side of the mounting beam and a coupling point on a bracket extending downwardly and rearwardly of the main beam. Also, the lower link is positioned to the left of the left-hand mower unit.

A pair of tension springs may be arranged between the main beam and the mounting beam to compensate a certain proportion of the weight of the machine or mower structure as the case may be. The left-hand spring is arranged generally adjacent the left-hand upper link and the right-hand spring arranged generally adjacent the right-hand upper link. Preferably the mounting points of the springs on the main beam are arranged close to, or coincident with, the pivot points of the upper links on the main beam. In this way, the required spring forces are minimised and the springs do not create a tipping force tending to tilt the machine or mower structure around said pivot points. The other ends of the springs are preferably attached to the mounting beam at points positioned slightly above the coupling points of the upper links on the mounting beam so that only small changes in the spring forces are caused even by a substantial displacement of the mower structure relative to the mounting beam. Obviously this is advantageous as the ground pressure of the mower units will not vary substantially when working on relatively uneven ground. The spring tensions may be adjusted in unison or independently so that the ground pressure of the total machine or mower structure as well as the individual working or mower units may be adjusted at will. Thus it is possible to set the machine so that the ground pressure of each individual working or mower unit is substantially the same.

Limit means may be provided to restrict movement of the main beam and associated components relative to the mounting beam so as to limit the stretching of the springs and bouncing when the machine is in a transport position. However, the limit means do not interfere with the flotation of the machine. The limit means may be in the form of a chain. Flotation limit means may also be provided which can be in the form of a link pivotally secured at one end to the main beam or the mounting beam and having a lost motion connection to the mounting beam or main beam, as the case may be.

In the case of a tractor mounted machine, the mounting beam is preferably pivotally mounted about a generally upright pivot axis on a three point hitch structure to enable the machine to swing from a transport position generally parallel to the tractor longitudinal axis and rearwardly of the tractor, to a working position generally transverse of, and offset relative to, the tractor. The mounting beam cannot move vertically relative to the three point hitch structure on the one hand, but can be raised and lowered together with the three point hitch structure on the other hand.

Preferably the main beam is positioned rearwardly of the mounting beam and extends generally parallel thereto. Also, the main beam may be extended to the left to a location generally rearwardly of the tractor power take-off (PTO) when the machine is in the working position. A gearbox may be mounted at the left-hand end of the main beam and arranged to receive motive power from the tractor PTO.

Also in the case of a tractor mounted machine, the machine may be carried by the tractor three point hitch and the working units may be located forwardly of the latter. With rotary mower units of the drum type, the vertical plane containing the rotary axes of the drums are preferably relatively close to, or coincident with, the vertical plane containing the axis of rear tractor wheels. In this way the pull to the left on the mower structure when making right-hand turns is reduced substantially. Another advantage is obtained in that the tractor operator is better protected against hard objects propelled by the fast rotating cutter blades since the right-hand tractor wheel and associated components are interposed between the operator and the mower.

In one embodiment of the invention, the links extend upwardly and forwardly from the main beam to the mounting beam with the latter having a rear section for attachment to the tractor three point hitch and a front section generally in line with the axis of the tractor rear wheels. In another embodiment, the links extend upwardly and rearwardly from the main beam to the mounting beam. This compact mounting of the machine on the tractor results in a more convenient operation and manipulation of the tractor with the machine attached thereto.

BRIEF DESCRIPTION OF THE DRAWINGS

An agricultural machine in the form of a drum mower and constructed in accordance with the present invention will now be described in greater detail, by way of example, with reference to the accompanying drawings, in which.

DETAILED DESCRIPTION OF A PREFERRED EMBODIMENT

The terms "forward," "rearward," "transverse," "left" and "right" used throughout the specification are with respect to the direction of movement of the machine in operation.

Figure 1:
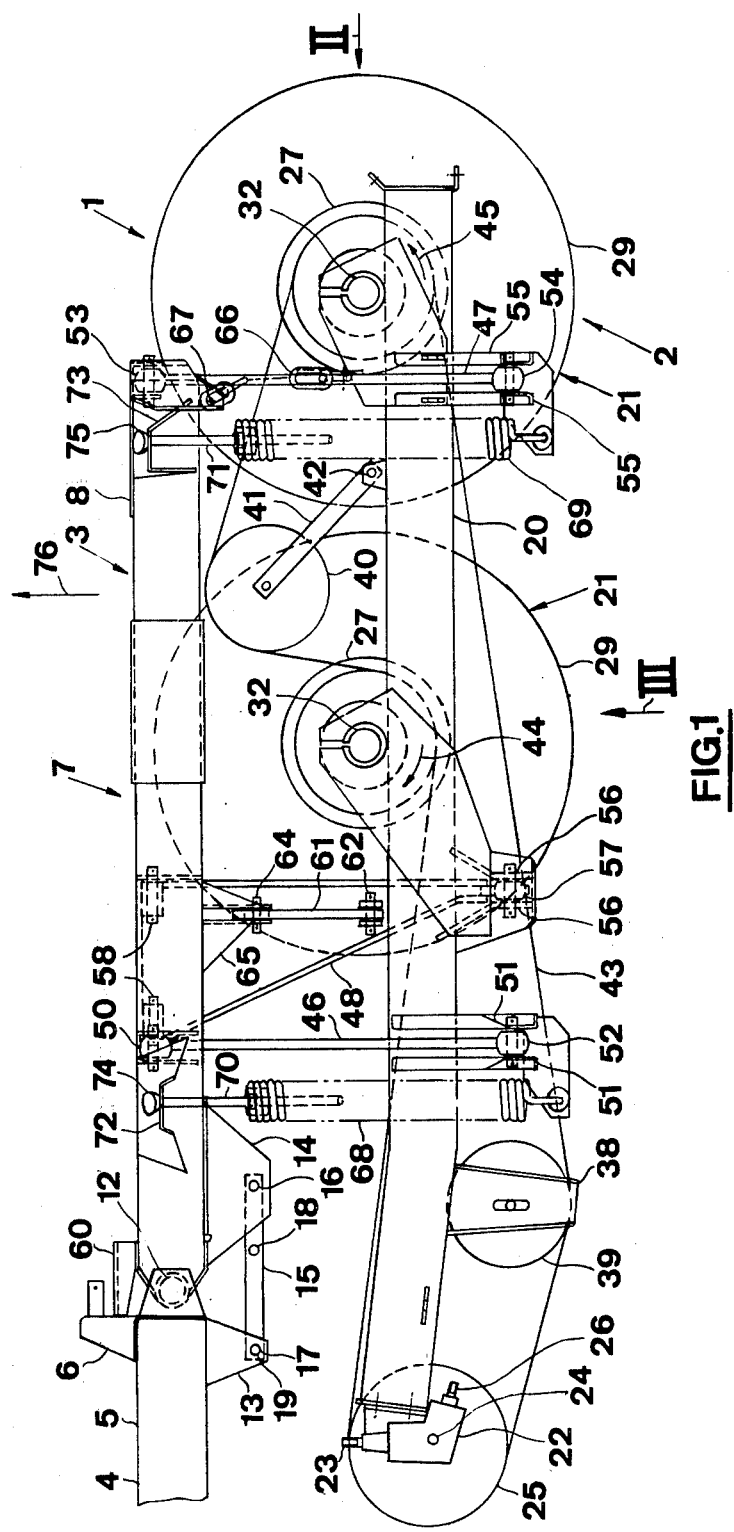
FIG. 1 is a top view of the mower.
Figure 2:
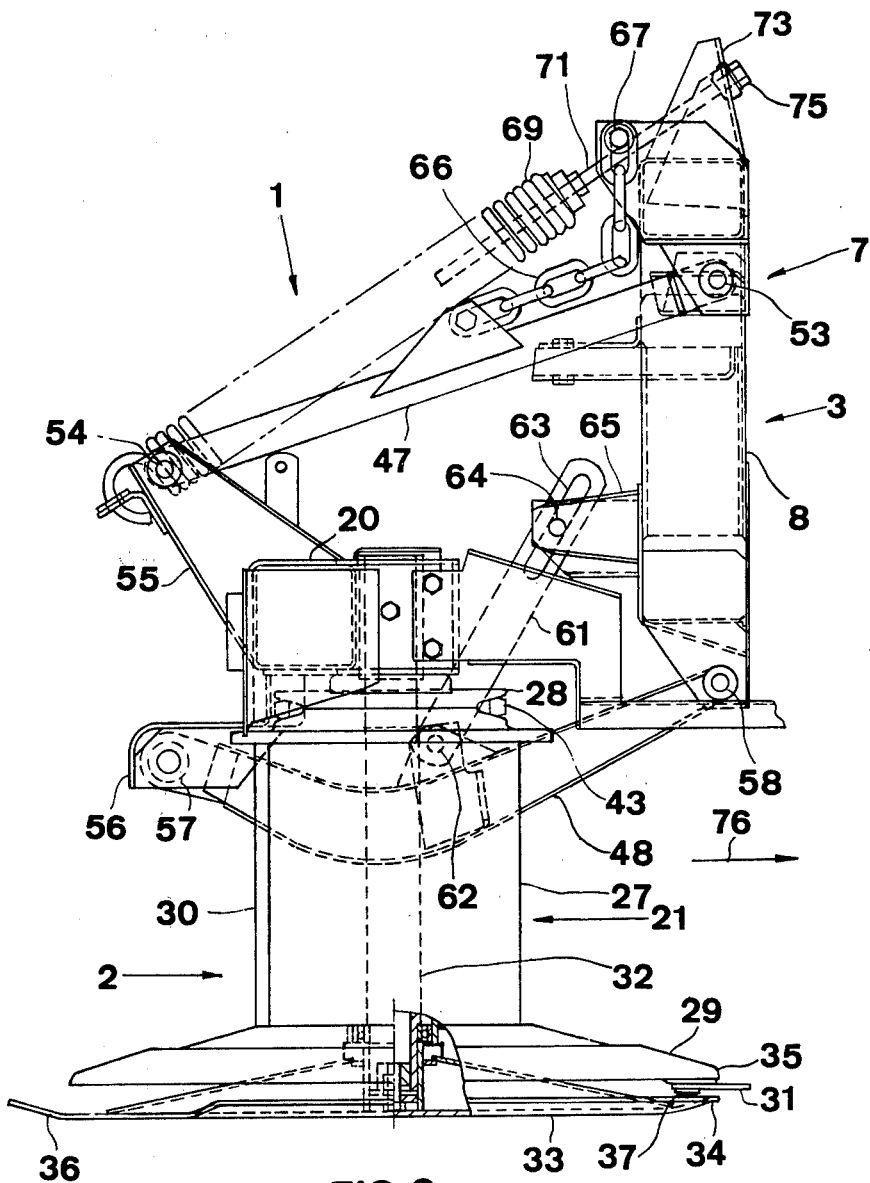
FIG. 2 is a side view taken in the direction of arrow II in FIG. 1.
Figure 3:
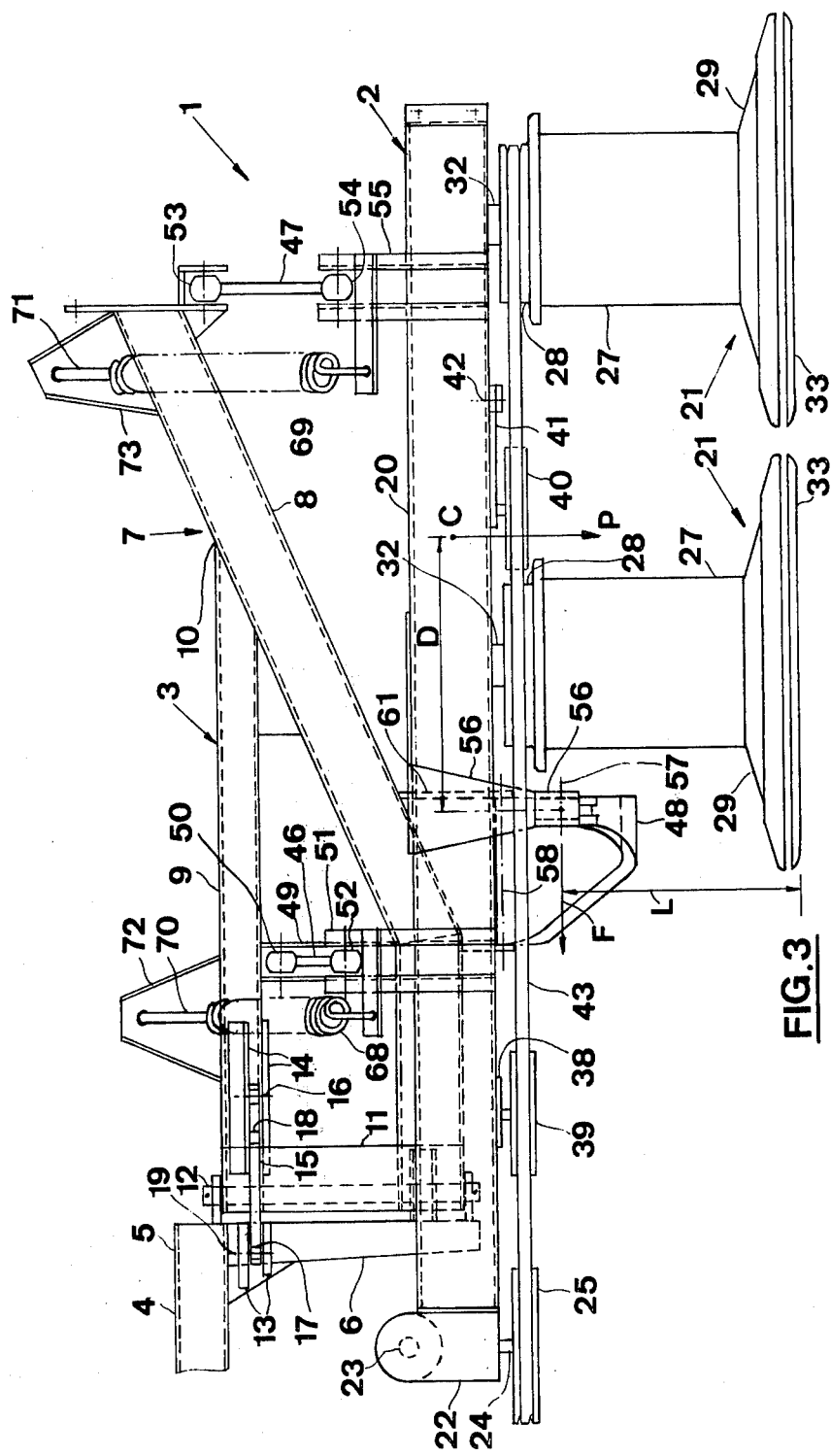
FIG. 3 is a rear view taken in the direction of arrow III in FIG. 1.

With reference to FIGS. 1 to 3, the drum mower is of the tractor-mounted type and is generally indicated at 1. The mower comprises a mower structure 2 mounted on a mounting beam 3 which is pivotally mounted on a three point hitch structure 4. The three point hitch structure 4 is of general rectangular shape, and comprises an upper transverse beam 5 and a pair of depending legs 6 (only the right-hand one being shown), and is arranged for coupling to the tractor three point hitch (not shown).

The mounting beam 3 comprises an elongate structure 7 composed of an angled main component 8 and a horizontal reinforcing component 9 coupled at one end 10 to the main component 8 intermediate its ends, and at the other end to an upright component 11 which is also coupled to one end of the angled component 8. The upright component 11, and thus the entire mounting beam 3, is pivotally mounted on the three point hitch structure 4 by an upright pivot 12 on the right-hand leg 6 of the structure 4. The three point hitch structure 4 further comprises a pair of lugs 13 on the right-hand leg 6 and another pair of lugs 14 is provided on the reinforcing component 9 of the mounting beam 3 at the same level as the lugs 13. A rod 15 is pivotally mounted on the lugs 14 via a pivot 16 in the form of a shearbolt. The rod 15 comprises a pair of apertures 17, 18 a selected one of which is arranged to receive a holding pin 19 which also can be inserted in a pair of aligned apertures in the lugs 13. With the holding pin 19 in the apertures in the lugs 13 and the aperture 17 of the rod 15, the mower structure is held in the operative position transverse of the tractor (shown in FIG. 1). With the holding pin 19 inserted in the apertures in the lugs 13 and the aperture 18 of the rod 15, the mower structure is held in the transport position generally rearwardly and longitudinally of the tractor (not shown). If in operative position, the mower hits a solid obstruction, the shearbolt 16 breaks and the mower swings back to the transport position rearwardly of the tractor. Such safety devices are generally known in the art.

An abutment member 60 on the mounting beam 3 is arranged to abut the stop formed by the right-hand leg 6 of the three point hitch structure 4 when the mounting beam 3, with the mower structure 2 thereon, is pivoted to the operative position.

The mower structure 2 comprises a main transverse beam 20 supporting in a depending fashion a pair of rotary drum mower units generally indicated at 21. The main beam 20 is extended to the left with its left-hand end generally rearwardly of the tractor power take-off (PTO) when in the operative position and supporting a gearbox 22. The gearbox 22 comprises a generally fore-and-aft extending input shaft 23 which is adapted to be coupled to the tractor PTO (not shown) via a universal joint shaft (not shown), and a generally downwardly projecting output shaft 24 supporting a V-pulley 25 at a level below the lower side of the main beam 20. The gearbox 22 is also provided with a further output shaft 26 (FIG. 1) from which crop conditioner means can be driven if such are provided.

Each rotary mower 21 comprises a generally upright mower drum 27 with a V-pulley 28 being an integral part thereof at the top end and supporting a truncated conical flange 29 at the bottom end. The mower drums 27 support generally axially extending crop conveying ribs or indents 30 (FIG. 2) and the flanges 29 support on their undersides cutter blades 31. The mower units 21 are rotatably mounted on stationary spindles 32 which are secured at their top end to the main beam 20 and which support at their lower end stationary skids or supporting members 33. The stationary skids 33 have generally circular forward edges 34 which are spaced at a small distance below the corresponding forward edges 35 of the flanges 29. The rear sections 36 of the skids extend beyond the rear edges of the flanges 29 to support the crop conditioner means if fitted. The stationary skids 33 are generally flat and may have a small upturned forward edge 34 to avoid the picking up of soil and dirt. The cutter blades 31 project beyond the circumference of the flanges 29 and beyond the forward edges 34 of the skids 33 when in the operative cutting position and are pivotally arranged on spindles 37 on the flanges 29 so that they can retract when hitting a solid obstruction.

The main beam comprises a support 38 rotatably supporting a tension pulley 39. A further tension pulley 40 is rotatably mounted on a spring-loaded (not shown) swinging arm 41 mounted on the main beam 20 at 42. A hexagonal belt 43 extends around the pulleys 25, 28, 39 and 40 in a manner as shown in FIG. 1 so as to drive the mower units 21 in opposite directions 44, 45.

The mower structure 2 is mounted on the mounting beam 3 via three links 46, 47, and 48. The link 46 is coupled at one end to a further upright component 49 (FIG. 3) on the mounting beam 3 via a universal joint 50 at a level generally above the mower structure 2, and at the other end to a bracket 51 on the main beam 20, also via a universal joint 52. The link 47 is coupled via a first universal joint 53 to the extreme right-hand end of the mounting beam 3 and via a further universal joint 54 to a bracket 55 on the main beam 20. Both brackets 51 and 55 extend upwardly and rearwardly from the main beam 20 and the links 46 and 47 extend upwardly and forwardly from the mower structure 2 to the mounting beam 3. Both links 46 and 47 may extend generally parallel to each other, although this is not essential. As shown in FIG. 3, the links 46 and 47 in this embodiment are not perfectly parallel to each other. From the description so far it will also be clear that the mower structure 2 is positioned generally below and rearwardly of the mounting beam and that the links 46 and 47 project over the main beam 20 in a forward direction from locations rearwardly of the main beam 20.

The third link 48 is curved when seen in side view and generally triangular in plan view. The link 48 is arranged at a level generally below the level of the link 46. The lower and rearward end of the link 48 is coupled to a downwardly and rearwardly projecting bracket 56 on the main beam 20 via a universal joint 57 and extends forwardly and slightly upwardly at a level below the main beam 20 and to the left of the left-hand mower unit 21. At its upper and forward end the link 48 is coupled to the mounting beam 3 via a pair of pivot shafts 58. It is clear from the above description that the link 48 passes below the main beam 20 from a location rearwardly of the beam 20 to a location forwardly thereof on the mounting beam 3.

A flotation limit arm 61 is pivotally mounted on the link 48 on a pivot 62 intermediate the ends of the link, the arm extending upwardly and forwardly. The flotation limit arm 61 comprises adjacent its other end an elongate aperture 63 through which projects a pin 64 which is secured on brackets 65 on the mounting beam 3.

The link 47 is coupled intermediate its ends to one end of a chain 66 which is secured at its other end to a fixation point 67 on the mounting beam 3 at a location above the universal joint 53 of the link 47. In operation, the chain 66 is normally slack and therefore does not interfere with the flotation of the mower structure 2.

A pair of springs 68 and 69 is arranged between the mower structure 2 and the mounting beam 3, the springs being attached at one end to respective brackets 51 and 55 to which also are coupled the upper links 46 and 47 via the respective universal joints 52 and 54. Preferably, though not necessarily, the springs 68 and 69 are attached to the brackets 51 and 55 at points coinciding with the main pivot points of the joints 52 and 54, or at least close thereto. The other ends of the spring 68 and 69 are coupled to threaded rods 70 and 71 which extend through apertures in brackets 72 and 73 on the mounting beam 3. Adjusting nuts 74 and 75 on the rods 70 and 71 and acting against the brackets 72 and 73 enable the tension in the springs 68 and 69 to be adjusted independently of each other. The apertures in the brackets 72 and 73 through which the rods 70 and 71 extend are positioned at a certain distance above the position of the joints 50 and 53 so that the springs 68 and 69 are inclined at a greater angle to the horizontal than the links 46 and 47.

A fixation linkage (not shown) pivotally mounted on the upper transverse beam 5 of the three point hitch structure 4 is arranged to be coupled to the main beam 20 of the mower structure 2 adjacent the gearbox 22 when the mower structure 2 is in the transport position to reduce bouncing of the mower structure 2 on its suspension during transport. When in transport position, the tractor three point hitch is in its raised position and the mower structure 2 pivoted around the pivot 12 in a position generally rearwardly of the tractor and extending in fore-and-aft direction (longitudinally) thereof. The mower is held in this position by the pin 19 being inserted in the apertures in the brackets 13 and the aperture 18 of the rod 15. When the tractor three point hitch, and hence the mounting beam 3, is raised, the mower structure 2 moves downwardly relative to the mounting beam 3 to the extent allowed by the length of the chain 66. In this way the extension of the springs 68 and 69 is minimised.

OPERATION OF THE PREFERRED EMBODIMENT

In use, the fixation linkage (not shown) between the three point hitch structure 4 and the main beam 20 is detached from the main beam 20 and the mower structure 2 swung around the pivot 12 to the transverse and offset position to the right-hand side of the tractor until member 60 abuts the leg 6 of the three point hitch structure 4. The mower structure 2 is secured in this position for normal working conditions by inserting the holding pin through the apertures in the brackets 13 and the aperture 17 in the rod 15. Should the mower structure 2 and/or mounting beam 3 hit a solid obstruction which could cause damage, the shearbolt 16 will break and the mower structure 2 and mounting beam 3 will swing back around the pivot 12. The universal joint shaft (not shown) is coupled to the tractor PTO to receive motive power therefrom.

In operation, the tractor three point hitch is lowered to the extent that the mower structure 2 touches the ground surface. The springs 68 and 69 contract a little by this movement and the flotation limit arm 61 is positioned so that the pin 64 is positioned approximately mid way along the elongate aperture 63. In this position, the supporting members or skids 33 rest with a certain pressure on the ground surface. The pressure of the skids 33 on the ground surface may be adjusted independently of each other by means of the adjusting nuts 74 and 75 on the threaded rods 70 and 71 coupled to the springs 68 and 69. The machine is driven in the field in the direction 76 and the mower units 21 are driven in the opposite directions 44 and 45 so as to cut the standing crop by impact and to discharge cut crop rearwardly through the opening defined between the adjacent mower drums 27 and above the flanges 29.

When a rise in the ground contour is met, the springs 68 and 69 assist in lifting the mower structure 2 relative to the mounting beam 3 and moving the mower structure over the rise. When a depression in the ground contour is met, the mower structure 2 automatically lowers relative to the mounting beam 3. Thus the mower structure fluently floats over ground irregularities in the intended direction of travel without the mower units either losing contact with the ground surface or dragging too heavily on the ground surface. If the mower structure 2 moves up and down over a substantial distance, the lengths of the springs 68 and 69 do not change much so that during such up and down movement, the ground pressure of the mower units is substantially constant. This is due to the particular positioning and orientation of the springs 68 and 69 and of the upper links 46, 47 as well as the fixation points of the spring 68 and 69 and the links 46, 47 on the mower structure 2 and the mounting beam 3. More particularly, the springs 68 and 69 and the links 46 and 47 are coupled to the mower structure 2 at about the same locations, whilst at their other ends, the springs 68 and 69 are coupled to the mounting beam 3 at locations spaced only short distances above the fixation points of the links 46 and 47 to the mounting beam. The smaller the distance between the joints 50 and 53 and the adjusting nuts 74 and 75, the smaller the variation in spring lengths will be for a given vertical displacement of the mower structure 2. Also, as the springs 68 and 69 act on the mower structure 2 at locations practically in line with the joints 52 and 54 of the upper links 46, 47 they exert no torque on the mower structure about the pivot points of the various universal joints.

When only one of the mower units 21 encounters a ground irregularity the position of the mower structure 2 is adjusted automatically since the joints 50, 52; 53, 54; and 57 allow independent flotation of the mower units 21. The non-universal pivot shafts 58 between the mounting beam 3 and the link 48 assure that, whilst floating up and down, the mower structure will not shift in the transverse direction. If this transverse shifting were not prevented, then it would be impossible to cut in a straight line. Two spaced pivot shafts 58 are provided in order to accommodate the load and this dictates the generally triangular shape of the link 48 as seen in plan view.

Up and down flotation of the mower structure 2 and especially of the left-hand portion of the main beam 20 is restricted to avoid damage to the drive, and more particularly to the universal joint shaft. This is accomplished by the provision of the flotation limit arm 61 with the elongate slot 63 therein. The respective ends of the slot 63 define the minimum and maximum flotation movement of the mower structure 2 relative to the mounting beams 3. As already mentioned, the chain 66 restricts the downward movement of the right-hand end of the mower structure 2 relative to the mounting beam 3.

As the mower structure 2 is mounted in a depending and trailing fashion with respect to the mounting beam 3, the mower structure is self releasing when a rise in the ground contour is met. This is another advantage of the structure according to the present invention.

The mower structure contacts the ground at a location rearwardly of the rear tractor wheels so that when taking right-hand turns the mower is subjectedl to a force F (FIG. 3) tending to shift the mower to the left. This force F is exerted on the mower structure 2 via the three point hitch structure 4 and the mounting beam 3. As the pivotal coupling 58 of the lower link 48 does not allow a transverse shift of the components relative to each other, the force F is transmitted to the mower structure at the location of the joint 57. This either results in a dragging of the mower structure 2 to the left over the ground, or, if the left-hand edge of the left-hand skid 33 grips the turf, a tipping of the mower structure in a counter clockwise direction around said left-hand edge of left-hand skid 33. The tilting or tipping force is thus $F \times L$, L being the distance of the joint 57 above the ground surface. This tipping force is opposed by the force formed by the weight P of the mower structure 3 acting at the centre of gravity C of said structure. This force is thus $P \times D$, D being the distance between the joint 57 and the centre of gravity C. To avoid tipping, it is necessary that the weight force remains larger than the tipping torque force, i.e. $P \times D > F \times L$. The tipping force can be reduced for a given turning speed, i.e. for a given force F, by reducing the distance L. As according to the invention the lower link 48 is coupled to the main beam 20 below the latter, then the distance L is already reduced substantially. Thus a very stable tractor-mounted or pull type mower is provided with which it is possible to maintain a high forward speed even when turning to the right.

The tendency for the mower structure to tilt about the left-hand edge of the left-hand skid is also increased with an increasing distance between the axis of the rear tractor wheels and the point of contact of the skids with the ground. Although in the illustrated embodiment the mower structure is mounted in a trailing fashion on a three point mounted mounting beam via a number of links of a substantial length, the mower structure is still relatively close to the wheel axis of the rear tractor wheels. This is accomplished by arranging the upper links 46 and 47 over the main beam 20 and the lower link 48 under the main beam 20 with the mounting brackets on the latter extending in a direction rearwardly of that beam and having the coupling points for the links at locations spaced rearwardly of the main beam 20. Thus, the horizontal distance between the main beam 20 and the mounting beam 3 is substantially smaller than the lengths of the links 46, 47, and 48.

From the foregoing it will be seen that with the present invention an exceptionally stable agricultural machine is obtained which is capable of being operated at relatively high forward speeds. More specifically a tractor mounted drum mower structure embodying the present invention can be operated at exceptionally high speeds and yet the mower units will accurately follow the ground contour, even when taking fast right-hand turns. The flotation and suspension system will absorb all ground irregularities both in the intended direction of travel as well as in a direction transverse thereto in an entirely satisfying manner, and yet the mower units will not shift in a transverse direction. With the suspension and flotation mechanism it is possible infinitely and accurately to adjust the ground pressure of adjacent mower units in case of a twin rotor machine both in unison and indpendently to obtain an even ground pressure over the full width of the machine. Furthermore, the ground pressure remains substantially constant even though the vertical displacement of the mower units in unison relative to the mounting beam and/or the vertical displacement of one mower unit relative to the other may be substantial.

Thus a very versatile and extremely well-functioning machine is provided which requires only a minimum of pulling and driving power, which is less subject to damage and wear, and which has less or no tendency to "bulldoze" and to damage the turf even when operated at extremely high speeds.

MODIFICATIONS

If the links 46, 47 and 48 form parallelograms with each other, then the mower structure will not move angularly when raised or lowered. However, it may be desirable that the mower structure is tilted rearwardly simultaneously as it is raised so as better to accommodate large rises in the ground contour. This may be accomplished by making the upper links 46 and 47 longer than the lower link 48, for example. In the embodiment of FIGS. 1 to 3 the lines of action of the springs 68 and 69 intersect the transverse pivot axes of the joints 52 and 54. In an alternative arrangement, the lines of action of the springs may be arranged to intersect the transverse pivot axis of the joint 57. The fixation points of the springs 68 and 69 on the mounting beam 3 would then be positioned slightly above the pivot shafts 58 of the link 48 on the mounting beam 3.

Figure 4:
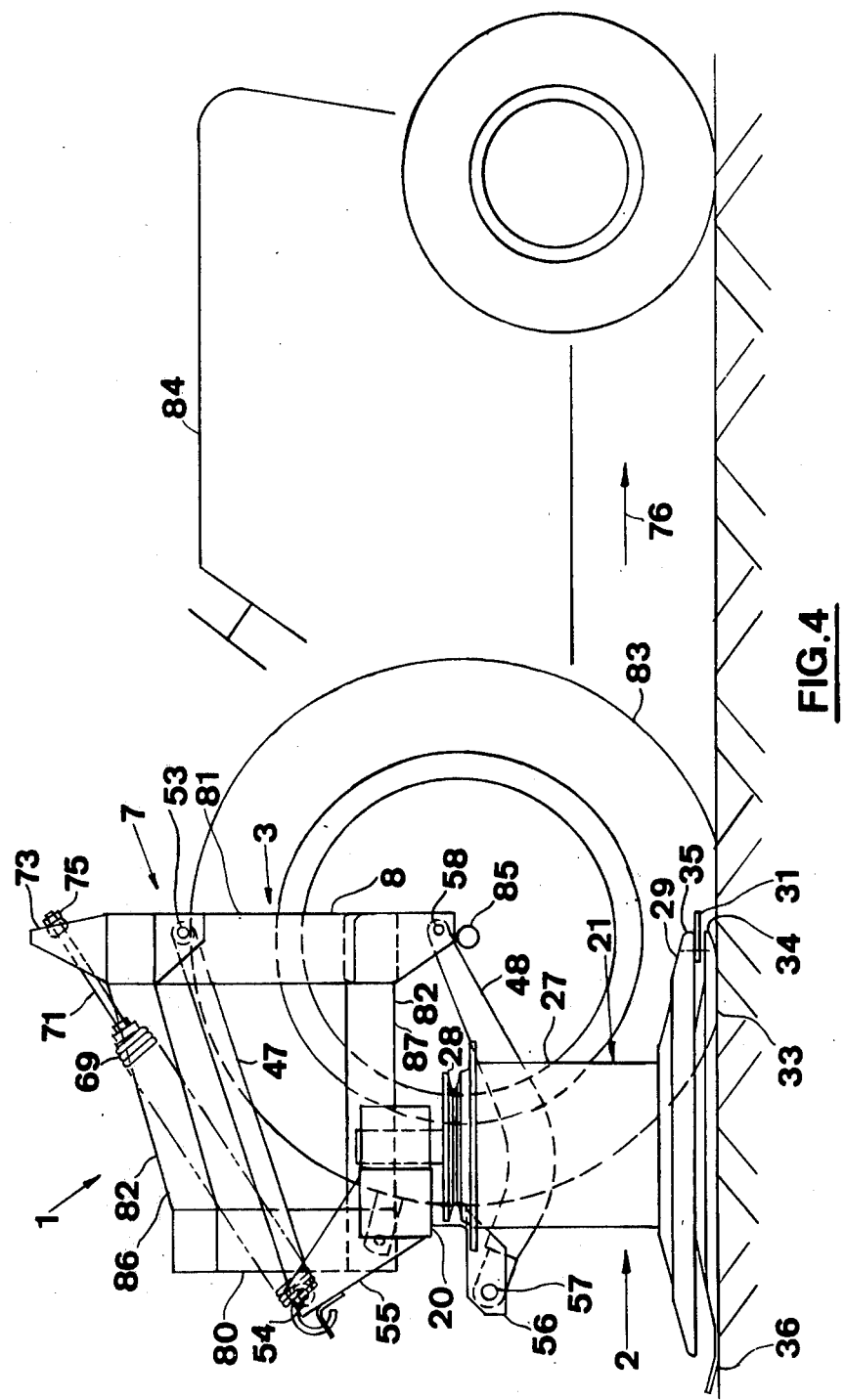
FIG. 4 is a side view similar to FIG. 2 but illustrating an alternative embodiment.
Figure 5:
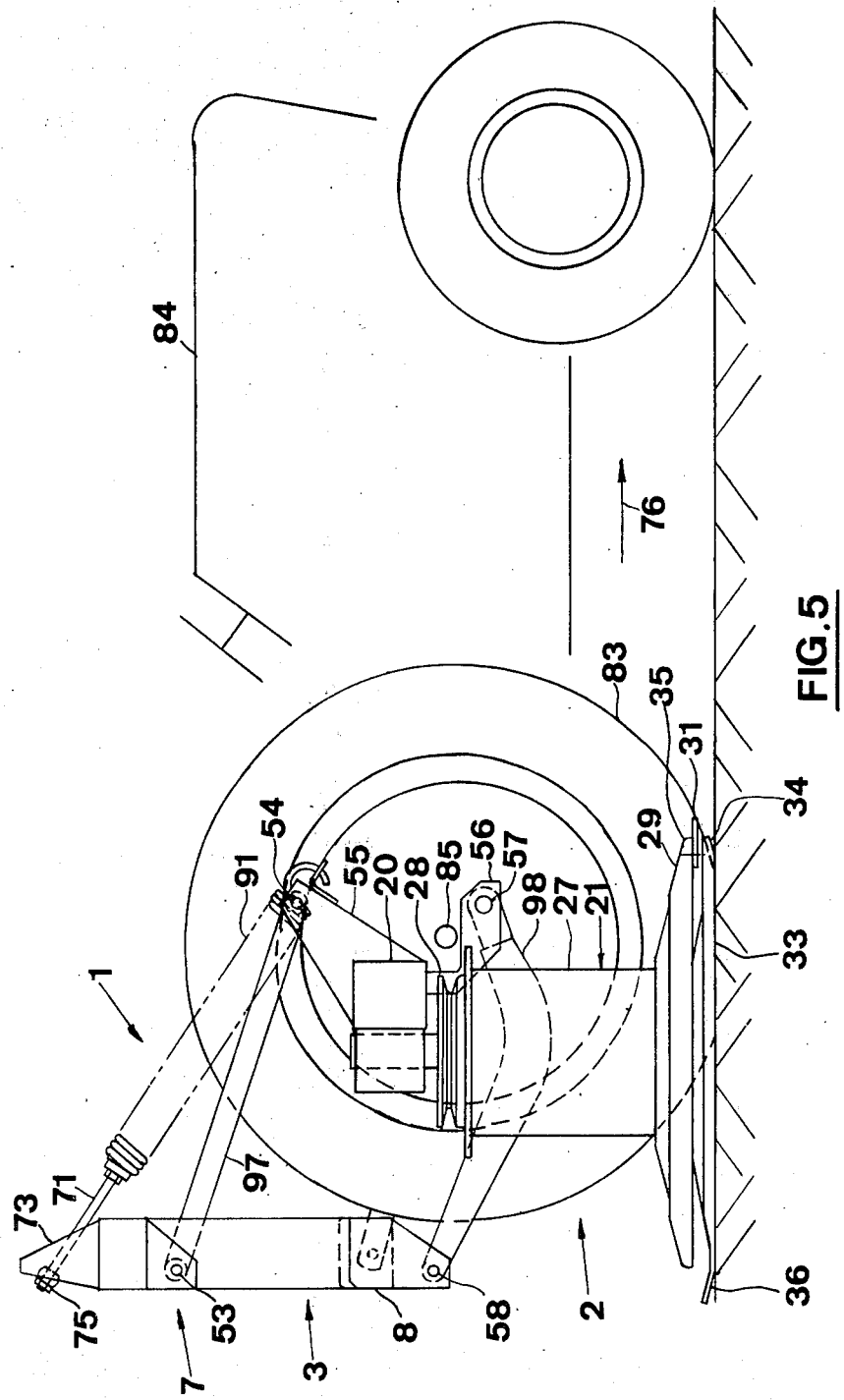
FIG. 5 is a side view similar to FIG. 2 but illustrating a further embodiment.

With reference to FIGS. 4 and 5, two other embodiments will now be described in greater detail. In these embodiments like components are indicated with like reference numerals.

FIG. 4 illustrates another tractor mounted mower wherein the mower structure 2 is mounted on the mounting beam 3 in a trailing fashion as in the embodiment of FIGS. 1 and 3. However, the mounting beam 3 is a different shape and comprises a rear portion 80 for coupling to the tractor three point hitch, a forward portion 81 spaced forwardly of the rear portion 80, and a coupling member 82 for coupling the rear and forward portions together. The forward portion 81 comprises an angled main component 8 and a horizontal reinforcing component 9, as well as upright components 11 and 49. The mower structure 2 is attached to the forward portion 81 of the mounting beam 3 in exactly the same manner as in the embodiment illustrated in FIGS. 1 to 3. When in the operative position, the forward portion 81 is positioned in a vertical plane passing through the tractor rear wheel axis 85. The mower units 21 are located forwardly of the three point hitch and are further forward in relation to the tractor compared with the units 21 of the embodiment shown in FIGS. 1 to 3.

The coupling member 82 extends in a general fore-and-aft direction alongside the right-hand tractor wheel 83 and comprises an upper and lower member 86 and 87 for coupling the rear portion 80 of the mounting beam 3 to the forward portion 81 thereof. The pivot 12 (not shown in FIG. 4) is provided between the three point hitch structure 4 and the rear portion 80 of the mounting beam 3.

With reference to FIG. 5, a tractor mounted mower is shown wherein the mower structure 2 is mounted on the mounting beam 3 in a manner so that it is positioned forwardly of the beam 3 and carried in front thereof during operation. The three point hitch structure 4 with the mounting beam 3 attached thereto are very similar to their counterparts of the embodiment shown in FIGS. 1 to 3. Also the links 96, 97 and 98 and springs 90 and 91 are very similar to their counterparts in the embodiment shown in FIGS. 1-3, the main difference being that, rather than extending downwardly from the mounting beam 3 in a rearward direction, they now extend downwardly in a forward direction. Thus, again, the mower structure 2 is positioned forwardly of the three point hitch structure 4 and closer to the vertical plane passing through the tractor rear wheel axis 85.

With the arrangements according to the FIGS. 4 and 5 a more compact combination of tractor and mower is obtained, resulting in a more convenient operation and manipulation. Also the above described pull to the left on the mower and the tendency to tilt when taking right-hand turns are reduced substantially. Finally, the operator is better safeguarded from being hit by any hard object flung by the fast rotating cutter blades 31 of the mower units 21.

Having thus described the invention what is claimed is:

1. An agricultural machine comprising:
   a mounting beam movable in operation at a predetermined, relatively invariable average height above the ground surface, said mounting beam being transversely disposed to a forward direction of travel during operation of said agricultural machine, said mounting beam having an inboard end and a spaced apart outboard end;
   a main beam suspended from said mounting beam for movement independently thereof;
   crop harvesting means operably depending downwardly from said main beam, said crop harvesting means having a lower ground engaging surface;
   first and second spaced apart linkage means interconnecting said mounting beam and said main beam for suspending said main beam from said mounting beam, both said first and said second linkage means including universal joints connecting the respective said linkage means to both said mounting beam and said main beam such that said main beam is movable relative to and independently of said mounting beam;
   a third linkage means spaced from both said first and said second linkage means to interconnect said mounting beam and said main beam for stabilizing said main beam against shifting in a transverse direction relative to said mounting beam and minimizing any turning moment encountered during a change in direction of travel which would tend to tip said agricultural machine about a portion of said ground engaging surface, said third linkage means including a universal joint for connection to said main beam, said universal joint on said third linkage means being positioned below said main beam, said third linkage means being connected to said mounting beam by a substantially horizontal pivot disposed transverse to the direction of travel; and
   drive means for driving said crop harvesting means.

2. The agricultural machine of claim 1 further comprising first and second spring means corresponding, respectively, to said first and second linkage means, each said spring means interconnecting said mounting beam and said main beam adjacent the respective linkage means to floatingly suspend said main beam from said mounting beam.

3. The agricultural machine of claim 2 wherein each said spring means includes a tension adjusting mechanism, each said tension adjusting mechanism being independently operable from the other said tension adjusting mechanism, said main beam including a bracket extending downwardly therefrom for connection with said universal joint of said third linkage means.

4. The agricultural machine of claim 2 further comprising a limit means for limiting the extent of vertical movement of said main beam relative to said mounting beam, said limit means including a rigid link and lost motion means for defining both a maximum and minimum displacement of said main beam relative to said mounting beam.

5. The agricultural machine of claim 4 wherein said rigid link and lost motion means interconnects said mounting beam and said third linkage means, said limit means further including a flexible link proximate to said outboard end, said flexible link being operable to limit a maximum displacement of said main beam relative to said mounting beam.

6. The agricultural machine of claim 4 wherein said mounting beam terminates in a three point hitch means at said inboard end for connection to the three point hitch of a tractor, whereby said agricultural machine is mounted directly on said tractor, said mounting beam further including a substantially vertically aligned pivot means adjacent said three point hitch means for selectively swinging said agricultural machine between transport and operational positions.

7. The agricultural machine of claim 6 wherein said transport position is generally rearwardly of said tractor with said main beam being substantially parallel to said direction of travel, said operational position being offset to the side of said tractor with said main beam being substantially transverse to the direction of travel.

8. The agricultural machine of claim 7 wherein said first and second linkage means are equal in length and disposed parallel to each other.

9. The agricultural machine of claim 8 wherein said first and second linkage means are longer in length than said third linkage means.

10. The agricultural machine of claim 9 wherein said main beam is disposed parallel to and rearwardly of said mounting beam.

11. The agricultural machine of claim 9 wherein said main beam is disposed parallel to and forwardly of said mounting beam.

12. A drum mower, adapted for mounting to a three point hitch of a tractor so as to be supported therefrom and positionable between operational and transport positions, comprising:
   a frame, including a mounting beam disposed transversely to a forward direction of travel when said drum mower is in an operational position and a three point hitch means for connection to said three point hitch of said tractor, said mounting beam being pivotably connected to said three point hitch means by a substantially vertically aligned pivot, said mounting beam having an outboard end spaced from said three point hitch means;

a main beam suspended from said mounting beam for movement independently thereof;

a pair of side-by-side drum mower units operably connected to said main beam in a downwardly depending fashion, each said mower unit having a lower ground engaging surface slidingly movable over the ground surface and a cutter means rotatably supported by said mower unit above and adjacent to said ground engaging surface for severing standing crop material;

first and second spaced apart linkage means interconnecting said mounting beam and said main beam for suspending said main beam from said mounting beam, both said first and said second linkage means including universal joints connecting the respective said linkage means to both said mounting beam and said main beam such that said main beam is movable relative to and independently of said mounting beam;

a third linkage means spaced from both said first and said second linkage means to interconnect said mounting beam and said main beam for stabilizing said main beam against shifting in a tranverse direction relative to said mounting beam and for minimizing any turning moment encountered during a change in direction of travel which would tend to tip said drum mower about a portion of said ground engaging surface, said third linkage means including a universal joint for connection to said main beam, said main beam including a bracket extending downwardly for connection to said universal joint of said third linkage means, such that said universal joint of said third linkage means is positioned below said main beam, said third linkage means being connected to said mounting beam by a substantially horizontal pivot disposed transverse to the direction of travel;

first and second spring means, corresponding, respectively, to said first and second linkage means, interconnecting said mounting beam and said main beam adjacent to said respective linkage means, each said spring means being operable to reduce ground contact pressure of said mower units and floatingly suspend said main beam from said mounting beam; and drive means for rotatably driving each said cutter means.

13. The drum mower of claim 12 wherein each said spring means includes a tension adjusting mechanism, each said tension adjusting mechanism being independently operable from the other said tension adjusting mechanism.

14. The drum mower of claim 12 further comprising limit means for limiting the extent of vertical movement of said main beam relative to said mounting beam, said limit means including a rigid link and lost motion means for defining and limiting both a maximum and a minimum displacement of said main beam relative to said mounting beam, said limit means further including a flexible link proximate to said outboard end for limiting the maximum vertical displacement of said main beam relative to said outboard end.

15. The drum mower of claim 14 wherein said mounting beam is pivotably movable about said vertical pivot between said transport and operational positions, said transport position being generally rearwardly of said tractor with said mounting beam being substantially parallel to the direction of travel, said operational position being offset to one side of said tractor with said mounting beam being substantially transverse to said direction of travel.

16. The disc mower of claim 15 wherein said drum mower units are located approximate to the rotational axis of the rear wheels of said tractor when said drum mower is in said operational position.

* * * * *